US005408479A

United States Patent [19]

Heller

[11] Patent Number: 5,408,479

[45] Date of Patent: Apr. 18, 1995

[54] APPARATUS AND METHOD FOR GENERATING HIGH INTENSITY ELECTROSTATIC FIELDS

[76] Inventor: Robert B. Heller, 1111 Loxford Ter., Silver Spring, Md. 20901

[21] Appl. No.: 161,401

[22] Filed: Dec. 6, 1993

[51] Int. Cl.[6] .......... H01S 3/00

[52] U.S. Cl. .......... 372/2; 372/37; 372/74

[58] Field of Search .......... 372/2, 37, 73, 74

[56] References Cited

U.S. PATENT DOCUMENTS

| | | | |
|---|---|---|---|
| 4,367,551 | 1/1983 | Gover | 372/2 |
| 4,438,513 | 3/1984 | Elias et al. | 372/2 |
| 4,562,380 | 12/1985 | Dionne | 372/2 |
| 4,636,688 | 1/1987 | Ito | 372/2 |
| 4,825,441 | 4/1989 | Marshall et al. | 372/2 |
| 4,864,575 | 10/1989 | Ahern et al. | 372/2 |
| 4,888,776 | 12/1989 | Dolezal et al. | 372/2 |

OTHER PUBLICATIONS

Godlove et al., "Relativistic Electron Beam Sources of Electromagnetic Radiation", SPIE vol. 105 For Infrared/Submillimeter Wave: Apr. 1977, pp. 17–21.

"Transmission of Beta-Rays by Nylon and Formvar" by Heller et al, *The Review of Scientific Instruments*, vol. 21, No. 11, 898–902, Nov. 1950.

*Primary Examiner*—Georgia Y. Epps

*Attorney, Agent, or Firm*—Pollock, Vande Sande & Priddy

[57] ABSTRACT

Apparatus and method for generating high intensity electrostatic fields for accelerating an electron beam. At least one thin dielectric film is charged on opposite faces thereof with charges of a like polarity. A near-relativistic beam is directed at the charged dielectric film in an area where the electrostatic field created by the surface charges is the greatest. The near relativistic electron beam is radially accelerated by the electrostatic field, generating free electron laser radiation. Electrostatic fields of different polarities or directions are utilized to accelerate the near relativistic electron beam in opposite directions. The radiation generated from each electrostatic field beam interaction is cumulative. Means are provided for charging the dielectric films with the surface charge of the same polarity to generate each electrostatic field.

14 Claims, 5 Drawing Sheets

VOLUME CHARGE DENSITY DISTRIBUTION $\omega(X)$ SHOWING $\omega_A$ USED IN CALCULATION OF ELECTRIC FIELDS PRODUCED NEAR EDGES OF DIELECTRIC DISKS

APPARATUS AND METHOD FOR GENERATING HIGH INTENSITY ELECTROSTATIC FIELDS

The present invention relates to the generation of high intensity electrostatic fields. Specifically, an apparatus is described for generating intense electrostatic fields which may be used to generate free electron lasing from an incident relativistic electron beam.

It is known from classic electrodynamic theory that radial acceleration of a near relativistic electron beam will produce radiation in the form of free electron lasing in the infrared region which travels in the direction of the relativistic electron beam.

In order to radially accelerate a near relativistic electron beam sufficiently to produce adequate quantities of free electron laser energy, a magnetic or electric field must be employed to produce extremely intense fields. Electron accelerators utilizing magnetic fields tend to be extremely large and heavy, making them impractical for many applications.

Apparatus for generating high intensity electrostatic fields similarly have disadvantages. Most of the devices used to generate an electric field of the required density employ mechanical moving belts, such as the Vandergraff generator.

The present invention is directed to the generation of such high intensity electrostatic fields without requiring the massive generation of electric charge, as required in the prior art. An electric field distribution is produced which can compress a small amount of electrostatic energy into a highly dense electrostatic field.

SUMMARY OF THE INVENTION

It is an object of this invention to provide an apparatus for generating a high intensity electric field.

It is a more specific object of this invention to provide an apparatus and method for generating a high intensity electrostatic field for radially accelerating a near relativistic electron beam.

It is a further object of this invention to provide for free electron lasing of a relativistic electron beam with an intense electric field.

These and other objects are provided by an apparatus and method in accordance with the present invention, which generates a high intensity electrostatic field. The high intensity electric field may be used to accelerate near relativistic electron beams producing free electron lasing.

The electric field is established transverse or perpendicular to the vector velocity of a near relativistic electron beam. The high intensity electric field is produced by charging a thin film dielectric so that opposite sides of the dielectric possess the same polarity of charge. The charge on each surface of the thin film dielectric constitutes area charges effectively separated by a distance equal to or less than the thickness of the thin film.

The separated charge produces an extremely intense electric field coincident with the plane of the thin film dielectric. These electrostatic fields can have an intensity near the edge of the dielectric which theoretically can rise to the order of gigavolts per meter ($10^9$ V/m).

The fringe fields produced in and out from the edges of the thin film dielectric are placed in the path of a linearly accelerated near relativistic electron beam. The interaction between the beam and the electric field produces significant electron lasing.

In a preferred embodiment of the invention, the electron beam may be radially accelerated as it passes by the edge of the thin film dielectric. Alternatively, electron beams in the 65–100 kilovolt range can penetrate the thin film dielectric and also be subject to sufficiently intense electrostatic fields to experience free electron lasing.

In another embodiment of the invention, an array of charged dielectrics is placed in the path of the near relativistic electron beam. The first dielectric film produces an electrostatic field of one direction and the second dielectric film produces an electrostatic field in the opposite direction. In this way, an incident relativistic electron beam is deflected away from and then back towards the axis of the electron gun as it passes by each of the thin film dielectrics.

In yet another embodiment of the invention, the electron beam takes on a cylindrical shape which encloses the charged dielectric(s) and experiences an expansion when the first field is traversed, and then a contraction when the second oppositely directed electrostatic field is traversed. In this way, laser radiation is produced as it passes through each electrostatic field. Velocity modulation imparted to electrons in the cylindrical beam as they pass between the electrostatic fields produces additional laser radiation which is cumulative with the laser radiation produced from radial acceleration of the near relativistic electron beam.

DESCRIPTION OF THE PREFERRED EMBODIMENT

Figure 1:
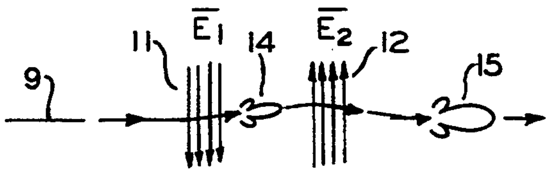
FIG. 1 illustrates the process of free electron lasing when a near relativistic electron beam traverses first and second electrostatic fields.

Referring now to FIG. 1, an illustration of the classical electrodynamic effect of generating free electron lasing of a near relativistic electron beam is shown. A near relativistic electron beam in the range of 65–100 kilovolts incident to a high intensity electrostatic field 11 (on the order of 10 gigavolts per meter). The electrostatic field 11 accelerates the relativistic electron beam radially, creating the laser radiation 14 in the infrared region.

A second opposite polarized electrostatic field 12 of intensity $E_2$ similarly radially accelerates the incident relativistic electron beam 9 in the opposite direction, restoring the electron beam to its original trajectory. The second acceleration creates additional laser radiation which combines with the laser radiation 14 to produce a higher intensity laser radiation 15.

The present invention creates the high intensity electrostatic fields for radially accelerating the near relativistic beam which can produce laser radiation without moving parts or massive electric potential generators. Intense electrostatic fields may be used in other diverse applications. These applications include creating desired crystalline structures, complex chemical reactions and long chain molecular disassembly.

Figure 2:
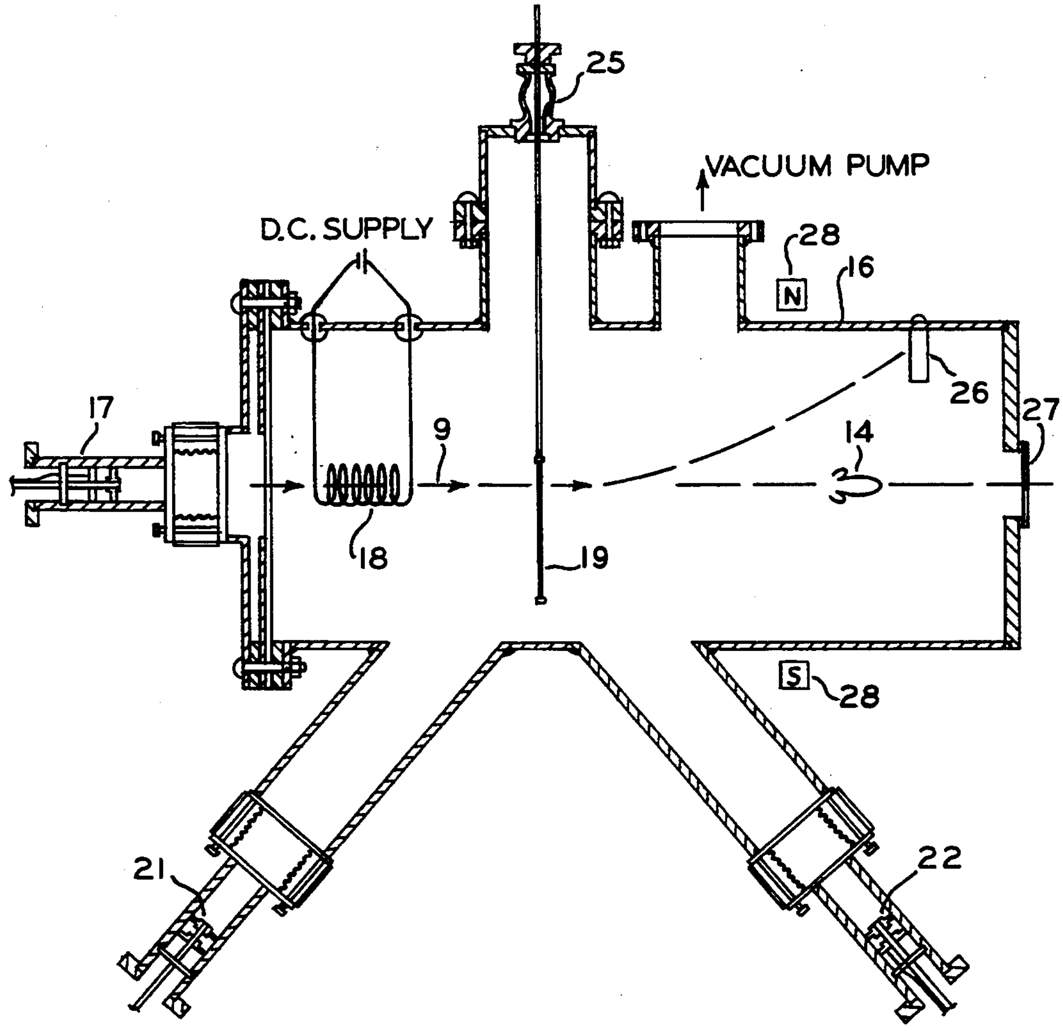
FIG. 2 illustrates an apparatus for charging a dielectric film to produce an electrostatic field for producing free electron lasing of an incident electron beam.

FIG. 2 illustrates a practical embodiment of a device which will produce laser radiation 14 in the infrared region. Referring now to FIG. 2, there is shown a vacuum chamber 16 which supports an electron gun 17 and magnetic beam focuser 18 for creating a near relativistic electron beam 9. Also supported within the vacuum chamber 16 is an electrostatic field generating device 19. The electrostatic field generating device 19 is a thin film dielectric material which is charged from second and third electron guns 21 and 22. The opposite surfaces of the thin film dielectric 19 are charged from the lower energy beam emanating from electron guns 21 and 22 with the same polarity charge distributed across opposite surfaces of the material.

The thin film dielectric is supported through a vacuum seal 25 so that it can be positioned accurately with respect to the incident near relativistic electron beam 9. A target 26 is shown which will collect the electron beam once it exits the electrostatic field created by the thin film dielectric 19. An external magnetic field created by 28 is used to deflect the beam 9 onto the collector 26, which can be a carbon anode.

An optical window 27 is shown which will permit the radiation 14 to exit the vacuum chamber 16.

Figure 3A:
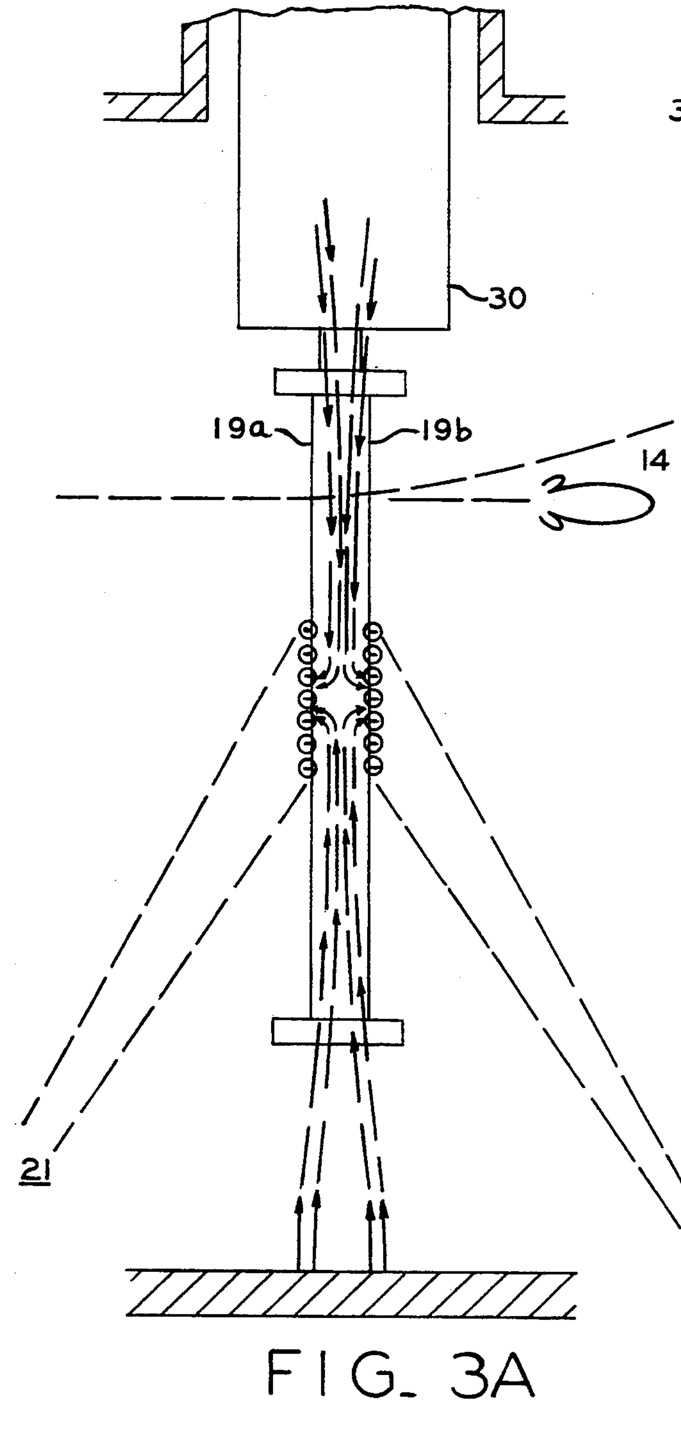
FIG. 3A illustrates the surface charge on a dielectric film which generates the high intensity electrostatic fields of FIG. 2, and a single non-cylindrical electron beam 9 penetrating the dielectric.

The generation of the high intensity electrostatic field by the thin film dielectric 19 is shown more particularly in FIG. 3A. The thin film has a mass density in the range of 0.01 milligrams/sq.cm to 0.22 milligrams/sq.cm. Electron charges with energies below 16 kilovolts are accumulated on the surface as a result of irradiating each surface with low energy electrons from the electron guns 21 and 22. The charged surfaces 19*a* and 19*b* have the same polarity and create an intense electrostatic field 11 having a field strength of 109 gigavolts per meter. The field strength is greatest at the edges of the thin film dielectric 19 of FIG. 2. The thin film dielectric 19 is supported on an insulating support 30 which extends through the seal 25 of FIG. 2 outside the vacuum chamber 16.

The electron guns 21 and 22 are operated for a short period of time to accumulate a sufficient amount of negative surface charge to create the high intensity electrostatic field. The high intensity electric field results because opposite surfaces are charged with the same polarity of charge.

As is well known in the art, an exact description of the resulting electrostatic field can be calculated by taking the negative of the gradient of the sum of the two potentials shown below. $V_1(x,y,z)$ represents the potential resulting from one of the charged surfaces, and $V_2(x,y,z)$ represents the potential created from the charge on the remaining opposite surface.

$$V_1(x,y,z) = \frac{-1}{4\pi\epsilon_1}\int_{-\frac{g}{2}}^{\frac{g}{2}}\int_{-\frac{g}{2}}^{\frac{g}{2}}\int_{-\frac{d}{2}}^{-\frac{a}{2}}\frac{\omega_S e^{-\alpha x'}}{|\bar{r}-\bar{r}'|}\,dx'dy'dz'$$

$$V_2(x,y,z) = \frac{-1}{4\pi\epsilon_1}\int_{-\frac{g}{2}}^{\frac{g}{2}}\int_{-\frac{g}{2}}^{\frac{g}{2}}\int_{\frac{d}{2}}^{\frac{a}{2}}\frac{\omega_S e^{\alpha x'}}{|\bar{r}-\bar{r}'|}\,dx'dy'dz'$$

$$\bar{r} = x\hat{x} + y\hat{y} + z\hat{z} \text{ and}$$
$$\bar{r}' = (x'\hat{x}' + y'\hat{y}' + z'\hat{z}')$$

Prime coordinates refer to source coordinate, unprimed coordinates are observer coordinates. $\alpha$ is the coefficient of charge penetration into the dielectric. $e^{-\alpha x'}$ is the exponential attenuation of the surface charge $\omega_S$.

Figure 3B:
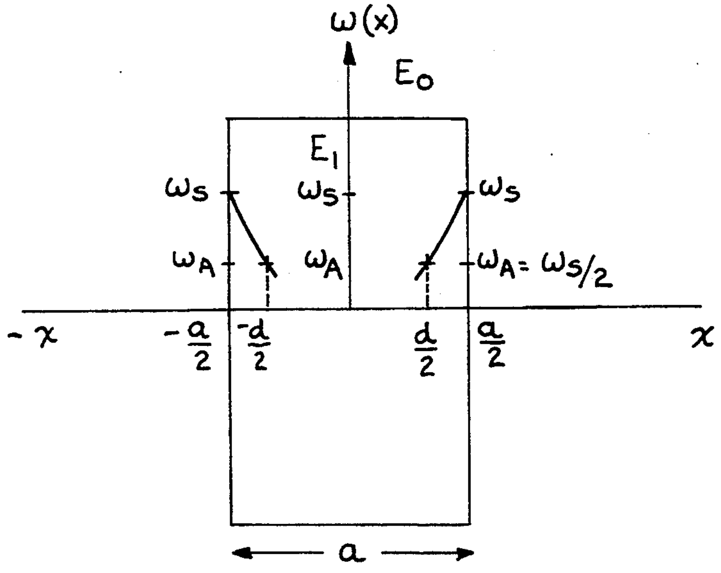
FIG. 3B shows the volume charge density distribution (penetration) used to calculate the electric fields produced near the edges of a dielectric.

The total electrostatic field $\bar{E}(x,y,z)$, the negative gradient of $V_1$ and $V_2$, can be approximated using an average $\omega_A$ charge on a dielectric film having a width of d as shown in FIG. 3B. The average surface charges are located at (d/2) and −d/2 around the (0, y, z)plane of symmetry, d is the thickness of the region of the dielectric which contains no charge. a is the thickness of the dielectric as shown in FIG. 3B. g is the assumed square dimension of the deposited charge for calculation purposes. The thin dielectric film width d is extremely small. An approximate solution for the magnitude of E at a point r inside the dielectric film on the plane of symmetry is $$|E_x| = 0,\ |E_y| = \frac{2}{4\pi}\,\omega_A y\,\frac{1}{\epsilon_1\left[\left(\frac{d}{2}\right)^2 + y^2 + z^2\right]^{1.5}} \text{ and}$$

$$|E_z| = \frac{2}{4\pi}\,\frac{\omega_A z}{\epsilon_1\left[\left(\frac{d}{2}\right)^2 + y^2 + z^2\right]^{1.5}}$$

For calculational purposes the thickness of the charged volume of the dielectric film can be reduced to a very small value.

It will now be shown that the electric field diverging from the region between the charged surfaces can become high enough to radially accelerate near relativistic beams which are near or which penetrate through the edges of the dielectric film.

Assume, for the sake of ease of calculation, that the charging beams from electron guns 21, 22 are 1 millimeter by 1 millimeter. Assume each beam is 1 milliampere and are turned on for one second. Assume each beam is 16 KEV so as not to completely penetrate the dielectric film. Assume the dielectric constant $\epsilon_1$ of the thin film dielectric, $\epsilon_1 = 4\epsilon_0$ where $\epsilon_0$ is the dielectric constant of the vacuum.

Let $\omega_S$ be the charge on the surface and $\omega_A$ an effective charge slightly below each surface. Assume $\omega_A = \frac{1}{2}\omega_S$ and located $10^{-7}$ meters below the dielectric film surfaces. $\omega_S$ calculates to 1000 coulombs per square meter.

The calculated electric fields $E_x$, $E_y$ and $E_z$ for observer coordinates at the point (0, 0, 0.002) and (0, 0.002, 0) yield about $5.6\times10^{11}$ volts/meter. The following describes, on a classic electrodynamic basis the energy radiated by a near relativistic beam passing through the $5.6\times10^{11}$ volts/meter region.

The energy radiated per unit solid angle Ω per unit angular frequency interval ω by a relativistic charge moving in instantaneously circular motion by an accelerating field can be shown to be $$\frac{dI(\omega)}{d\Omega}=\frac{e^2}{4\pi^2c}\left|\int_{-\infty}^{\infty}\frac{\bar{n}\times[(\bar{n}-\bar{\beta})\times\dot{\bar{\beta}}]}{(1-\bar{\beta}\cdot\bar{n})^2}e^{i\omega(t-[\bar{n}\cdot\bar{r}(t)/c])}\,dt\right|^2$$

for the specified motion r(t). β is the classic v/c of beam 9 of FIG. 2 and $\dot{\beta}$ the $$\frac{1}{c}\ \frac{d\bar{v}}{dt}$$

caused by the electrostatic field producing the non-linear (usually circular) motion. The limits of integration shown are for an extended time of interaction. For short periods of interaction, definite integral limits are used.

In the electrostatic field being investigated here, the interaction time of the radial acceleration due to the force field at the disk edge is approximately $$\tau\sim\frac{a}{v}=\frac{\text{(edge field effective thickness)}}{\text{(Beam velocity)}}.$$

We estimate this to be $$\tau\sim\frac{100\times10^{-6}\text{ meters}}{.42\times3\times10^{8}}<8.5\times10^{-13}\text{ seconds.}$$

This short interaction term limits the integration interval to Γ seconds, instead of $-\infty$ to $\infty$.

Since the position vector $\bar{r}(t)$ in the exponent is of the order $<|\bar{v}|>t$, (the average of the beam velocity of beam 9 multiplied by time t) relative to a suitable origin. This means that the $$\frac{\bar{n}\cdot\bar{r}(t)}{c}$$

term is about 0.42 times as small as the 't' term in the exponent for a 50 KEV near relativistic electron beam. This requires a complicated multiple expansion solution of the equation $$\frac{dI(\omega)}{d\Omega}=\frac{e^2}{4\pi^2c}\left|\int_{-\infty}^{\tau}\frac{\bar{n}\times[(\bar{n}-\bar{\beta})\times\dot{\bar{\beta}}]}{(1-\bar{\beta}\cdot\bar{n})^2}e^{i\omega(t-[\bar{n}\cdot\bar{r}(t)/c])}\,dt\right|^2.$$

Assume the "edge" field developed around square millimeter charging beams 21, 22 is maintained at the value $5.6\times10^{11}$ volts per meter. Calculations show that the total power (joules per second) radiated in 4 π steradians in the infrared bandwidth $4\times10^{13}\pm2\times10^{12}$ radians per second for a beam interaction time of $8.5\times10^{-13}$ seconds from one negative charged dielectric film would be 0.43 watts. This would be mostly in the forward main lobe and some in the side lobes.

Radiation in the millimeter band centered at 100 giga radians per second with a 10% bandwidth will be 18 milliwatts for identical beam and field strengths used in the previous infrared calculation. Multiple periodic pairs of charged dielectric thin films will obviously increase the radiated (lasing) power.

An electrostatic field oriented in the direction opposite to the electrostatic field of FIG. 3A is created from positive charges on opposite sides of a dielectric film. It is within the state of the art to implement two separate positive molecular beam generators, which will charge the thin dielectric film to create an oppositely directed electron beam for radially accelerating the near relativistic electron beam in the opposite direction. Alternatively, FIGS. 4 through 6 illustrate how the positively charged surfaces may be implemented.

Figure 4:
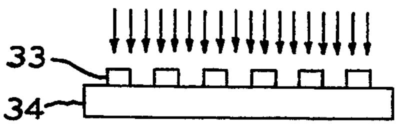
FIG. 4 illustrates ion implantation of a substrate to produce a multiplicity of positively-charged thin film surfaces.
Figure 5:
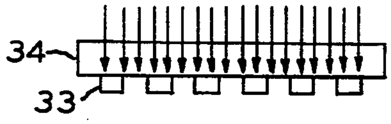
FIG. 5 illustrates ion implantation of the opposite side of the film of FIG. 4.
Figure 6:
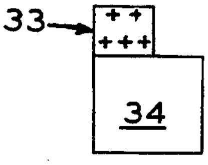
FIG. 6 illustrates the positive charge associated with a cleaved single implanted silicon dioxide section of the thin film of FIGS. 4 and 5.

FIGS. 4 through 6 illustrate how two (2) nearly identical intensity positive molecular beams can be used to permanently implant positive charges on opposite faces of a number of dielectric films. FIG. 4 shows the positive ion implantation of the top side of silicon dioxide mesas on a supporting nylon substrate 34.

FIG. 5 illustrates the implementation of ions into the opposite side of the mesas of silicon dioxide 33. The implantation process for the silicon dioxide mesa contacting the nylon support may be different, requiring more energetic ion beams.

FIG. 6 illustrates the positive charges accumulated on a single silicon dioxide mesa on its nylon substrate.

Figure 7:
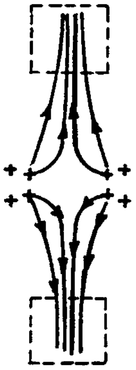
FIG. 7 illustrates the electrostatic field created within a positively charged thin film.

The electric field produced from the two surfaces of the film is shown in FIG. 7. The positive ions produce a field directed opposite to the electrostatic field produced from the electron surface charge, such as is shown in FIG. 3A.

Figure 8:
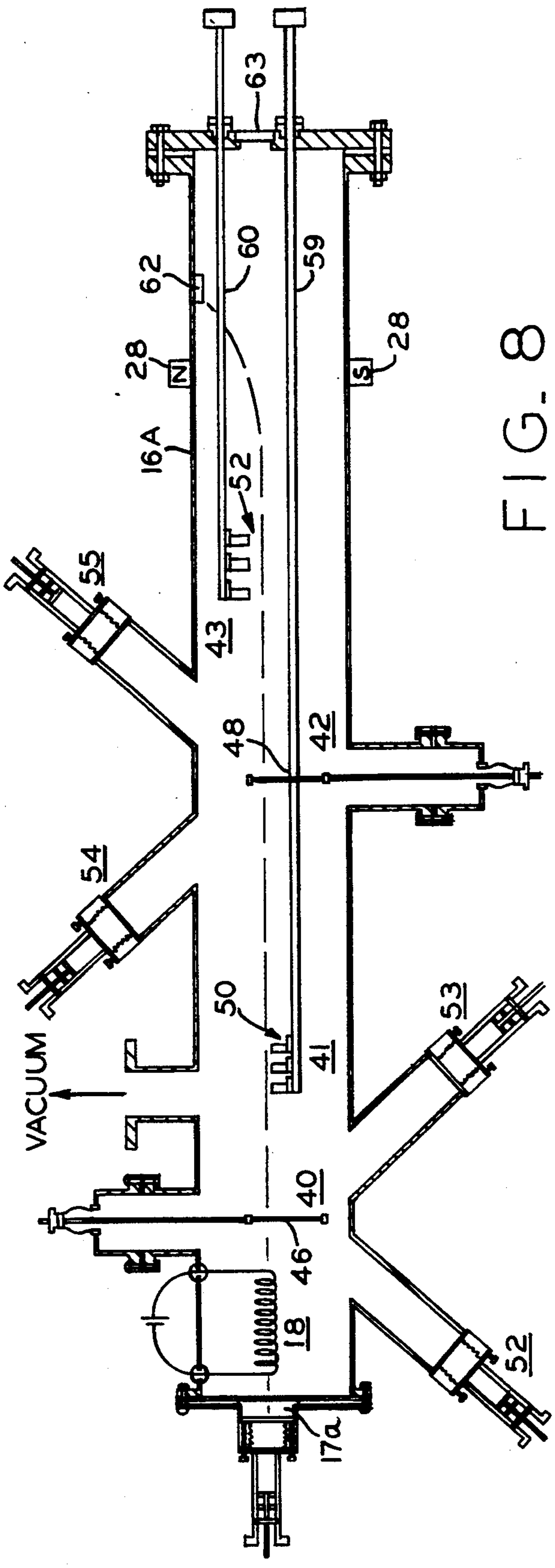
FIG. 8 illustrates a device for generating free electron lasing from multiple alternating electrostatic fields.

FIG. 8 shows an embodiment of the invention wherein the relativistic electron beam generated by electron gun 17*a* is incident to a plurality of electric fields which alternate in polarity. Electric fields which alternate in polarity are established at 40, 41, 42 and 43. The electric fields at 40 and 42 are derived from electron bombardment of film dielectric 46 and 48. The electric fields produced at 41 and 43 are derived from substrates 50 and 52 which are ion-implanted silicon dioxide mesas supported on a thin film.

Electron guns 52, 53 and 54, 55 radiate each side of the dielectric films 46 and 48 to produce the required negative charge. Supports 59 and 60 support the dielectrics for movement within a vacuum chamber 16*a*.

The electron gun 17*a* emits a near relativistic electron beam which is focussed by the magnetic field of 18. The near relativistic electron beam is radially accelerated by the first electrostatic field 46, and then radially accelerated in the opposite direction by the second oppositely directed electrostatic field 41. The near relativistic electron beam is once again radially accelerated by the electrostatic field 42 and electrostatic field 43.

The alternating acceleration given to the near relativistic beam by each of the electric fields 40, 41, 42 and 43 emits laser radiation which is cumulative. The near relativistic beam is collected at a target 62 within the vacuum chamber 16*a*. An externally applied magnetic field changes its trajectory toward 62.

The configuration of FIG. 8 permits the electron beam to be radially accelerated a multiple number of times, generating each time free electron lasing of the electron beam. The window 63 is provided for emitting the generated laser radiation.

Figure 9:
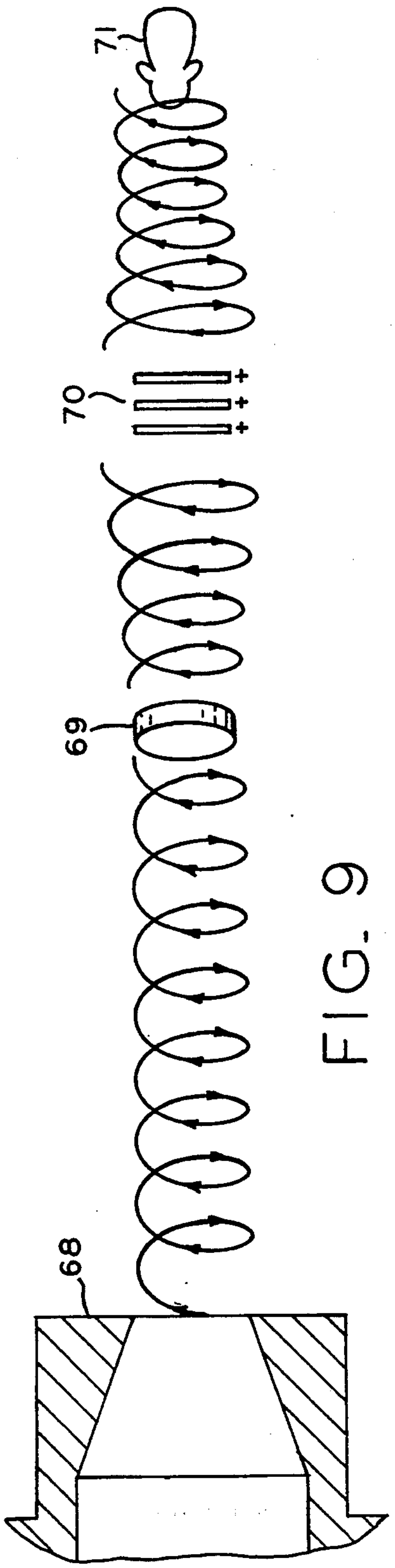
FIG. 9 illustrates the effect of a series of alternating electrostatic fields created by thin film dielectrics on a helically-generated cylindrical electron beam.
Figure 10:
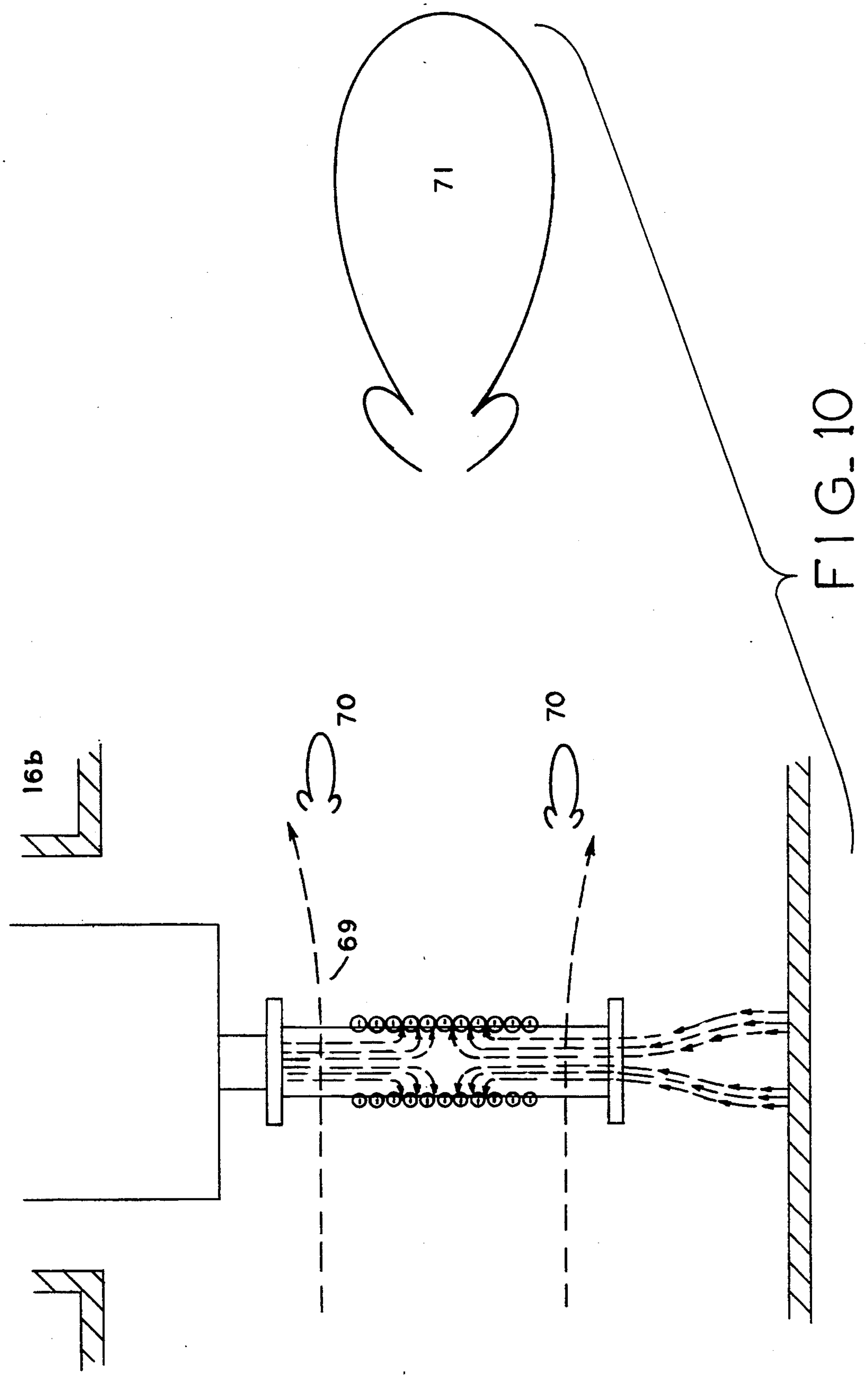
FIG. 10 illustrates the cumulative lasing effect of the interaction between the electrostatic field of a thin film dielectric with a cylindrical electron beam.

FIGS. 9 and 10 illustrate an embodiment which will provide for additional laser generation from the near relativistic electron beam. Referring specifically to FIG. 9, a conventional gyratron electron gun 68 is shown which emits a helically-directed beam. The gyratron gun 68 forms an essentially cylindrical relativistic beam. When the beam reaches a first negatively-charged dielectric film 69, having electron charges deposited on each side thereof, the cylindrical form is expanded from the radial acceleration of the electrons within the beam.

When the cylindrical beam encircles a second positively charged dielectric 70, the beam contracts again towards its original configuration emitted from the gyratron 68.

The process of accelerating the helical near-relativistic electron beam in first and second directions also provides a velocity modulation to the electron beam. The resulting velocity modulation also produces free electron lasing, adding to the radiation generated from the near relativistic beam.

FIG. 10 illustrates the support of the first dielectric 69 in a vacuum chamber 16*b*, which receives the hollow, helically-directed near relativistic beam. As can be seen, the beam is incident to the edge portion of the dielectric film 69 which has the most intense electrostatic field. Radiation is given off at each point along the perimeter of the helical electron beam, forming a composite laser beam 71.

Thus, there has been described an apparatus and method for producing high intensity electrostatic fields which are useful in generating laser radiation from an incident, near-relativistic electron beam. Those skilled in the art will recognize yet other embodiments of the invention described by the claims which follow.

What is claimed is:

1. An apparatus for generating high intensity electrostatic fields comprising:
- at least one thin dielectric film for receiving on opposite faces thereof charges of a like polarity; and,
- means for supplying charges of like polarity to each side of said thin dielectric film.

2. The apparatus of claim 1, wherein said means for supplying like charges to each side of said thin dielectric field comprises an electron gun means for radiating each side of said dielectric film with a like polarity charge.

3. The apparatus of claim 2, wherein said electron gun means comprises first and second electron guns positioned to irradiate said thin dielectric on opposite sides thereof.

4. An apparatus for radially accelerating an electron beam to produce laser radiation comprising:
- at least one thin planar dielectric film capable of being charged on opposite sides thereof;
- means for charging opposite sides of said thin dielectric film to produce a high intensity electrostatic field at the edges of said dielectric film; and,
- means for directing a near relativistic electron beam into said high intensity electrostatic field, whereby said electron beam is accelerated radially and emits electromagnetic radiation.

5. The apparatus of claim 4, wherein said means for charging opposite sides of said dielectric film comprises first and second electron guns positioned to radiate said opposite sides with an electron beam, forming a charged surface on each side of the dielectric film.

6. The apparatus of claim 5 further comprising at least one second dielectric film parallel to said first planar dielectric substance, said second planar film being charged on each side with the same charge but opposite the charge polarity on said first dielectric film, said second dielectric film creating an electrostatic field for accelerating said beam radially in a direction opposite the first radial acceleration.

7. The apparatus of claim 6, wherein said second dielectric film comprises a positively charged thin $SiO_2$ film.

8. The apparatus of claim 4, wherein said electron beam is formed in a cylindrical shape which encircles said dielectric film, whereby said cylindrical beam is subject to electrostatic forces which form a conical beam from said cylindrical beam.

9. An apparatus for generating electromagnetic radiation from a near relativistic electron beam comprising:
- a vacuum chamber having at one end thereof an electron gun, and at an opposite end a window for emitting electromagnetic radiation;
- a thin dielectric film supported between said electron beam and said window; and,
- second and third electron guns supported in said vacuum chamber for charging opposite sides of said dielectric film with a charge of the same polarity, whereby an intense electrostatic field in the plane of said film is created which radially accelerates said near relativistic electron beam generating electromagnetic radiation which is incident to said window.

10. The apparatus of claim 9, further comprising a second dielectric film having two sides charged with the same polarity and opposite the polarity of said first film charge, generating a second electrostatic field having a direction which is opposite said first electrostatic field which accelerates said near relativistic beams towards an axis of said first electron gun, creating additional electromagnetic radiation incident to said window.

11. The apparatus of claim 10, wherein said first electron beam produces a cylindrical beam which encloses said first and second dielectric films.

12. A method for generating electromagnetic radiation from the interaction of an electric field and near relativistic electron beam comprising:
- charging opposite sides of a dielectric film with equal charges of a like polarity charge creating an intense electric field in the plane of said dielectric film; and,
- directing a near relativistic electron beam through said electrostatic field in a direction in which said field imparts radial acceleration to said electron beam radiation.

13. The method according to claim 12, further comprising a second dielectric film charged on opposite sides thereof with a charge of opposite polarity to the charge on said first dielectric film, creating a second electrostatic field for imparting a radial acceleration to said beam opposite to said first direction producing additional electromagnetic radiation.

14. The method according to claim 13, wherein said near relativistic electron beam is a helically-directed cylindrical beam which encloses said dielectric films, wherein said cylindrical beam is alternately expanded and compressed by said first and second electrostatic fields, velocity modulating said electron beam further producing additional electromagnetic radiation.

* * * * *